United States Patent [19]
Föller

[11] 3,971,415
[45] July 27, 1976

[54] THROTTLE VALVE
[75] Inventor: Werner Föller, Heiligenrode, Germany
[73] Assignee: Gestra-KSB Vertiebsgesellschaft mbH & Co. Kommanditgesellschaft Bremen, Bremen, Germany
[22] Filed: July 14, 1975
[21] Appl. No.: 595,825

[30] Foreign Application Priority Data
Sept. 18, 1974 Germany............................. 2444607

[52] U.S. Cl. ........................................ 137/630.19
[51] Int. Cl.²......................................... F16K 1/44
[58] Field of Search................. 137/630.19, 630.22; 251/210

[56] References Cited
UNITED STATES PATENTS
1,724,017  8/1929  Godfrey..................... 137/630.19 X
3,153,498  10/1964  Bakker....................... 137/630.19 X FOREIGN PATENTS OR APPLICATIONS
1,023,845  1/1953  France
1,085,388  7/1960  Germany....................... 137/630.19
1,193,325  5/1965  Germany

*Primary Examiner*—Robert G. Nilson
*Attorney, Agent, or Firm*—Allison C. Collard

[57] ABSTRACT

A throttle valve having a valve seat element with a coaxial jacket which has a plurality of flow-through channels positioned at different planes, and a piston-like locking member is stroke displaceably disposed within the jacket and having a sealing face at its front surface which cooperates with a first valve seat. The jacket is surrounded by a second stroke displaceably disposed locking element having a sealing face at its front surface opposite to the valve seat element, which cooperates with a second valve seat, mounted on the valve seat body, both locking elements being connected with each other for stroke movement.

8 Claims, 1 Drawing Figure

U.S. Patent  July 27, 1976  3,971,415
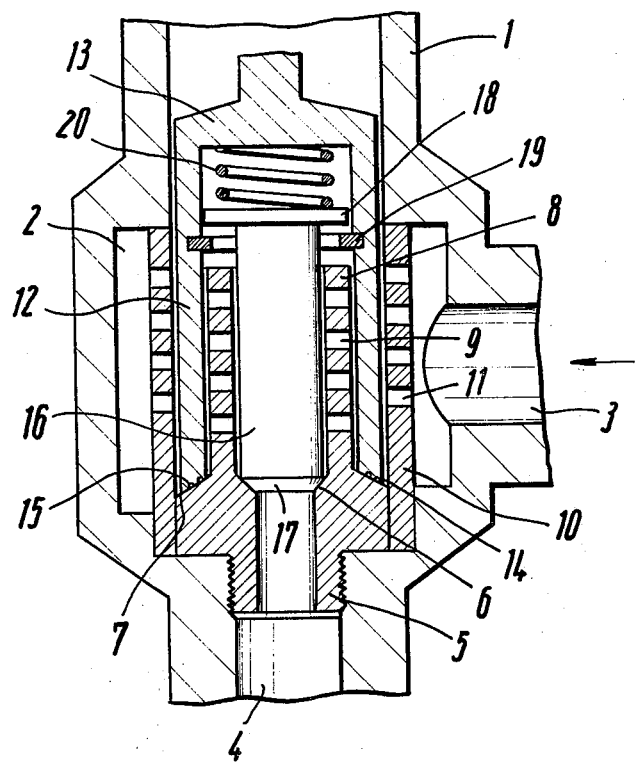

THROTTLE VALVE

The present invention relates to throttle valves which are characterized in that they are simple and space saving in their construction and have very sensitive controllability.

With respect to the required stroke moveability of the locking element in the jacket, and in order to fulfill the required measurement tolerances during manufacturing, a radial clearance between the piston-like locking element and the jacket is provided in the practical embodiment of these types of valves. Due to this radial clearance, medium may flow between the locking element and the valve seat even with only slight lifting of the sealing surface of the locking element from the valve seat, i.e., even before the inner cross-section of the jacket is opened to the lowermost radial flow-through channels. At a high pressure differential between the pre-pressure side and the low pressure side of the valve, very high flow-through speeds are present at the relative small clearance between the valve seat and the locking element, which may result in erosion wear and tear at the sealing surfaces of the valve seat and the locking element. This is particularly true at a high opening and closing rate of the valve.

It is therefore an object of the present invention to improve the throttle valve of the aforementioned type wherein a substantially erosion free sealing place is provided. This objective of the invention is obtained by a jacket encompassed by a second stroke movable locking element having a sealing face at its front face opposite to the valve seat element which cooperates with a second valve seat mounted on the valve seat body whereby both locking elements are stroke moveably connected with each other.

Relative to the medium flow, a sealing takes place at two places which are connected in series within the valve. To open the valve, preferably the front (first) locking member, when viewed in direction of the medium flow, is lifted from its associated valve seat. The other locking member remains in closed position due to the loading, for example, by the locking spring, and in view of the relative moveability of the two locking members. Thus, no medium flows, and no erosion wear will take place between the two locking positions, although the front locking member is already released from its seat. Only when the front locking member is released completely from its associated seat faces are the seat faces no longer subject to erosion wear, and the rear locking member is released from its associates seat. This, for example, can be obtained if the through-flow cross-section between the corresponding seal surfaces of the locking member and seat is a multiple of the radial clearance between the locking member and the jacket. Thereby, the valve is provided with a sealing space which is substantially protected against erosion wear.

Several simple and operational embodiments of the locking member are set forth in the application. Moreover, a space saving device is provided, as well as a locking spring which is closed off with respect to the flowing medium.

Other embodiments are particularly suitable when used with gases and vapors, wherein a multi-state pressure drop of the medium is carried out.

Other objects and features of the present invention will become apparent from the following detailed description when taken in connection with the accompanying drawing of which the only FIGURE of the drawing is an axial cross-sectional view of the throttle valve of the invention.

As shown in the drawing, a valve housing is provided with an inner chamber 2 which is connected with an inlet port 3 and one outlet port 4. A valve seat element 5 is mounted in the outlet port 4 having two valve seats 6 and 7. Between these two valve seats, valve seat element 5 carries a jacket 8. The latter is provided with a plurality of radial flow-through channels 9 which are positioned at different planes. A second jacket 10 is concentrically positioned in the inner chamber 2 of the valve housing and at a radial distance with respect to the jacket 8. This second jacket is also provided with a plurality of radial flow-through channels 11 which are positioned at different planes and which are offset with respect to the channels 9 of the jacket 8. If so desired, the jacket 10 may be rotatably adjustable.

A pipe-like locking element 12 is provided between the two jackets 8 and 10, which has a front surface 13 located at a distance above the jacket 8. The lower annular front face of the locking member 12 which faces the valve seat element 5 faces a sealing surface 14 which cooperates with the valve seat 7, and for this purpose it is provided with concentric profile grooves 15. In order to assure the stroke moveability of the locking element 12, a small radial clearance is provided between the locking element and the jackets 8 and 10.

A piston-like locking member 16 is provided in the jacket 8 and consequently within the locking member 12.

The piston has a conically shaped face 17 at its lower end which cooperates with the valve seat 6, while at the end of the upper piston, a cam shoulder 18 is provided which cooperates with a cam ring 19 which is mounted on locking member 12. Furthermore, a spring 20 is provided between the cam shoulder 18 and the front face 13, which exerts a pressure on the locking member 16 in the locking position. Between the locking member 16 and the jacket 8, a small annular clearance is provided to assure the stroke movability of the locking member 16.

For locking purposes, the locking members 12 and 16 with their associated sealing surfaces 14 and 17 are brought together into a sealing engagement on the valve seat surfaces 6 and 7. For a throttled flow-through of the medium, the locking members 12 and 16 are lifted from the seats 6 and 7, and a different number of flow-through channels are released depending on the stroke position. Thereby, the medium is subjected to a first throttle action when flowing through the channels 11. The medium then is subjected to a pressure drop between the jackets 8 and 10 and is subjected to a final drop in flow pressure through channels 9.

When opening the valve, only the locking member 12 is lifted from its seat in the first phase by an actuating means (not shown). In view of the axial distance between the cams 18 and 19, the locking member 16 rests under the influence of the locking spring 20. Therefore, no medium flow can form at the locking places 7 and 14. During the further opening of locking member 12, the cam ring 19 engages cam shoulder 18, so that the cone surface 17 of the locking member 16 is lifted from the valve seat 6. Due to the flow of the medium at this point, the flow speed to be expected in the range of the closing space 7 and 14 is below the speed which would cause wear and tear due to erosion at the sealing face 14 of the locking member 12 or at the valve seat 7, respectively. During a further lifting of the locking members 12 and 16 from the aforementioned position, the desired number of through-flow channels 9 and 11 are obtained. The locking member 16 prevents a wear and tear, due to erosion on the sealing surface 14 of the locking member 12 and at the valve seat 7.

While only a single embodiment of the present invention have been shown and described, it will be obvious to those skilled in the art that many changes and modifications may be made thereto without departing from the spirit and scope of the invention.

What is claimed is:

1. A throttle valve having a valve housing with inlet and outlet openings, and responsive to an actuating member comprising:
    a valve seat element having a first valve seat for closing the outlet opening, and a second valve seat communicative to the inlet opening, said valve seat element having a coaxially extending jacket formed with a plurality of flow-through channels positioned at different planes;
    a first piston-type locking member displaceably and adjustably disposed within said jacket and having a first sealing surface which cooperates with said first valve seat;
    a second locking member displaceably disposed and surrounding said jacket, and having a second sealing surface opposite to said valve seat element which cooperates with said second valve seat on said valve seat element, said first and second locking members being displaceably connected with each other; and
    means for biasing said first locking member with respect to said second locking member.

2. The throttle valve according to claim 1 said biasing means comprises a locking spring.

3. The throttle valve according to claim 2 wherein said second locking member is closed at its upper portion by a front surface above said first locking member and said jacket.

4. The throttle valve according to claim 3 wherein said locking spring is tensioned between said first locking member and said front surface of said second locking member.

5. The throttle valve according to claim 1 wherein said second locking member comprises a pipe-like locking element and is adapted to be displaced by the actuating member, and means on said second locking member for moving said first piston-type locking member after completion of a relative stroke.

6. The throttle valve according to claim 1 wherein said second locking member is formed with at least one concentric groove on said second sealing surface.

7. The throttle valve according to claim 1 further comprising a second jacket concentrically surrounding said second locking member and formed with a plurality of radial through-flow channels and secured to the valve housing.

8. The throttle valve according to claim 7 wherein said through-flow channels of both of said jackets, respectively, are offset with respect to each other.

* * * * *